Figure 1:
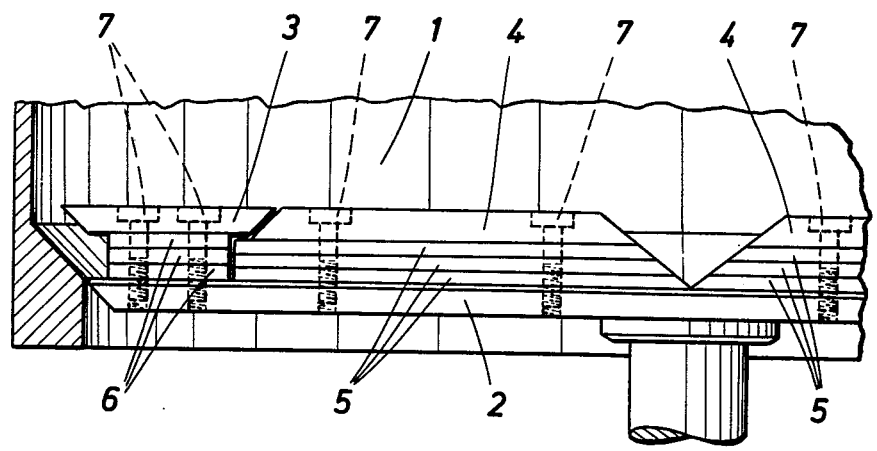

United States Patent [19]
Bacher

[11] 4,120,460
[45] Oct. 17, 1978

[54] DISINTEGRATING APPLIANCE

[75] Inventor: Helmuth Bacher, Linz, Austria

[73] Assignee: Krauss-Maffei Austria Gesellschaft m.b.H., Asten Nr. 211, Austria

[21] Appl. No.: 803,228

[22] Filed: Jun. 3, 1977

[30] Foreign Application Priority Data

Jun. 8, 1976 [AT] Austria .................................. 4168/76

[51] Int. Cl.² .................... B02C 18/12; B02C 18/18
[52] U.S. Cl. .............. 241/278 R; 241/292.1; 241/294
[58] Field of Search ............ 241/46 A, 46.08, 46.11, 241/46.17, 191, 257 G, 278 R, 275, 292.1, 294, 298

[56] References Cited

U.S. PATENT DOCUMENTS

| | | | |
|---|---|---|---|
| 3,155,326 | 11/1964 | Rhodes | 241/275 X |
| 3,381,904 | 5/1968 | Glidden | 241/294 X |
| 3,486,701 | 12/1969 | Smith | 241/46.08 |
| 3,547,360 | 12/1970 | Sherman, Jr. | 241/292.1 X |
| 3,771,732 | 11/1973 | Cumpston, Jr. | 241/46.11 |
| 4,015,781 | 4/1977 | Beck | 241/46.11 |

*Primary Examiner*—Howard N. Goldberg
*Attorney, Agent, or Firm*—Kurt Kelman

[57] ABSTRACT

An upright container having an open top end contains a rotor disc, which is mounted for rotation on a vertical axis and spaced below said open top end and has a periphery which extends close to the inside surface of said container. A plurality of cutting teeth are mounted on said disc and disposed at its periphery. At least two radial ribs are mounted on the top of said disc.

2 Claims, 2 Drawing Figures

DISINTEGRATING APPLIANCE

This invention relates to an appliance for disintegrating and regenerating synthetic thermoplastic waste, comprising an upright container, which is adapted to be charged from above, and a disclike rotor, which constitutes the bottom of the container and is set with cutting teeth at its periphery.

In known appliances for transforming thin synthetic thermoplastic waste into flowable granules, the cylindrical container has a separate bottom, through which the rotor shaft extends, and a diametrally extending cutter bar is carried by said shaft (German Pat. Nos. 2,156,198 and 1,679,834). These appliances have the disadvantage that the waste plastics material to be processed accumulates in blocks between the bottom of the container and the cutter bar and gives rise to jamming and high bearing loads or even to a stalling of the entire appliance. Besides, it is hardly possible to vary the radial conveying characteristic of the cutter bar and an adaptation to different kinds of waste is not enabled.

Whereas it is known to disintegrate waste material by an appliance in which a rotor which is set with cutting teeth at its periphery has the shape of a disc and thus replaces the bottom of the container (Printed German Application 1,283,080; Opened German Pat. No. 2,005,252) and this design precludes a coiling and jamming between the bottom and rotor, the conveying action and the feeding of material to the cutting teeth are not satisfactory and an adaptation to different conditions of operation is not possible too.

It is an object of the invention to eliminate these disadvantages and so to improve the appliance described first hereinbefore that the material is properly agitated and properly supplied to the cutting teeth and different operating conditions can be selected in dependence on the nature of the material.

This object is accomplished according to the invention in that the rotor is provided at its top with at least two radial ribs.

By these ribs, the waste material disposed in the container above the disclike rotor is properly engaged, agitated, and repeatedly caused to move radially outwardly to the cutting teeth. It will be understood that the cutting teeth provided on the rotor may cooperate with fixed cutting teeth provided on the wall of the container.

To enable an adaptation to different materials and other conditions of operation, the number of ribs may be selectable and variable. Besides, the height of the ribs and possibly also of the cutting teeth above the surface of the rotor may be variable by the provision of replaceable shims, which can be superimposed in different numbers, so that optimum operating conditions for a given material to be processed can be obtained.

It has been found to be desirable to provide for each cutting tooth of the rotor airib which extends to said tooth so that material is fed to each cutting tooth.

Finally, the number of cutting teeth may also be selectable or variable so that the disintegration can be effected at a desired or required rate at a given speed of the motor.

Figure 2:
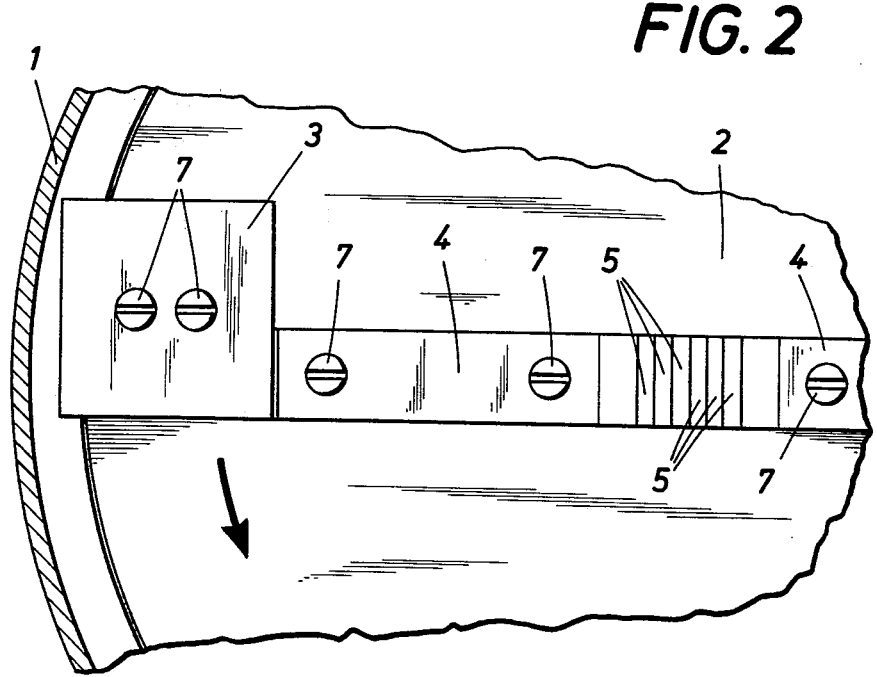

An embodiment of the invention is shown by way of example on the accompanying drawing, in which FIG. 1 is a vertical sectional view taken through the rotor and container axis and showing the significant parts of an appliance for disintegrating or regenerating waste synthetic thermoplastics and FIG. 2 is a corresponding top plan view.

An upright cylindrical container 1 contains a disclike rotor 2 extending in a horizontal plane, which constitutes the bottom of the container and which is provided at its periphery with cutting teeth 3 having a cutting edge extending in a horizontal plane, which may cooperate with stationary cutting teeth, not shown, that are mounted on the wall of the container 1.

In accordance with the invention, the rotor 2 is provided on its top surface with at least two radial ribs 4, each of which extends to one cutting tooth 3. In the direction of rotation of rotor 2, indicated by an arrow in FIG. 2, rib 4 is flush with the cutting tooth associated therewith. The ribs 4 and cutting teeth 3 are provided with shims 5, 6, respectively, which are replaceable and can be superimposed in different numbers so that the elevation of the ribs 4 and cutting teeth 3 can be varied. The number of ribs and possibly also of the cutting teeth can also be selected and varied, provided that the disclike rotor 1 has bores for fixing screws 7. It will be understood that two aligned ribs may be combined in a diametral rib.

What is claimed is:
1. An appliance for disintegrating synthetic thermoplastic waste material, comprising
 (a) an upright container having an open top for receiving the waste material and an open bottom,
 (b) a rotor disc mounted in the open bottom of the container for rotation in a horizontal plane about a vertical axis,
   (1) the container having an inside surface defining the open bottom and the rotor disc having a periphery extending close to the inside surface,
 (c) a plurality of cutting teeth mounted on the rotor disc and disposed at the periphery thereof,
   (1) each cutting tooth having a cutting edge extending in a horizontal plane,
 (d) a like plurality of radial ribs mounted on the rotor disc and projecting upwardly therefrom,
   (1) each of the ribs being associated with a respective one of the cutting teeth and leading thereto, and
   (2) the ribs being flush with the associated teeth in the direction of rotation of the rotor disc, and
 (e) shim means mounted detachably between the rotor disc and each of the ribs and of the cutting teeth for adjusting the height of the ribs and teeth.

2. The disintegrating appliance of claim 1, wherein the shim means comprises a plurality of shims, the shims, the ribs and the cutting teeth being mounted detachably on the rotor disc.

* * * * *